United States Patent
Byrisetty et al.

(10) Patent No.: US 7,155,480 B2
(45) Date of Patent: Dec. 26, 2006

(54) CLIENT-SERVER CONFERENCE AND USER SEEKING THROUGH A SERVER STORING A LIST COMPRISING ACTIVE CONFERENCE SERVERS AND EXCLUDING NONACTIVE CONFERENCE SERVERS

(75) Inventors: Rajeev Byrisetty, Bellevue, WA (US); Mu Han, Renton, WA (US); Don Ryan, Redmond, WA (US); Thomas Pfenning, Redmond, WA (US); Stefan Solomon, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 37 days.

(21) Appl. No.: 09/157,697

(22) Filed: Sep. 21, 1998

(65) Prior Publication Data

US 2002/0174171 A1 Nov. 21, 2002

(51) Int. Cl.
*G06F 15/16* (2006.01)
*H04N 7/14* (2006.01)
*H04L 12/16* (2006.01)

(52) U.S. Cl. .................. 709/204; 709/203; 709/219; 709/227; 348/14.08; 370/260

(58) Field of Classification Search .................. 709/203, 709/204, 205, 206, 227, 219; 713/201; 348/14.08, 348/14.09; 345/330; 370/260
See application file for complete search history.

(56) References Cited

U.S. PATENT DOCUMENTS

| | | | | |
|---|---|---|---|---|
| 516,708 A | * | 8/1894 | Laportre et al. | 395/650 |
| 5,907,324 A | * | 5/1999 | Larson et al. | 345/330 |
| 5,968,121 A | * | 10/1999 | Logan et al. | 709/219 |
| 5,999,208 A | * | 12/1999 | McNerney et al. | 348/14.08 |
| 6,006,253 A | * | 12/1999 | Kumar et al. | 709/204 |
| 6,006,331 A | * | 12/1999 | Chu et al. | 713/201 |
| 6,038,602 A | * | 3/2000 | Ishikawa | 709/227 |
| 6,049,878 A | * | 4/2000 | Caronni et al. | 713/201 |
| 6,108,706 A | * | 8/2000 | Birdwell et al. | 709/229 |
| 6,138,144 A | * | 10/2000 | DeSimone et al. | 709/204 |
| 6,163,531 A | * | 12/2000 | Kumar | 370/260 |
| 6,167,446 A | * | 12/2000 | Lister et al. | 709/223 |
| 6,185,565 B1 | * | 2/2001 | Meubus et al. | 707/10 |
| 6,240,089 B1 | * | 5/2001 | Okanoue et al. | 370/390 |
| 6,438,111 B1 | * | 8/2002 | Catanzaro et al. | 709/223 |

OTHER PUBLICATIONS

Handley, M., et al., "SDP: Session Description Protocol", Network Working Group University of Glasgow, Oct. 27, 2003, (49 pages).
Handley, M., et al. "Session Announcement Protocol", Network Working Group, Oct. 2000, (20 pages).
IP Telephony with TAPI 3.0. Microsoft Corporation, Apr. 1999, (39 pages).
Carney, Rob, "ISBU Membership (U2) LDAP Server Access Control Design", Apr. 28, 2004, pages 1–9.

* cited by examiner

*Primary Examiner*—Paul H. Kang
(74) *Attorney, Agent, or Firm*—Perkins Coie LLP

(57) ABSTRACT

Client-server conference and user seeking is disclosed. In one embodiment, a system includes at least one server of a first type, a server of a second type, and a client. Each of the at least one server of the first type maintains at least one conference. The server of the second type stores a server list of the servers of the first type. The client queries this latter server to obtain the server list, and then is able to query each server on the list to learn of the conferences maintained by these servers. User lists may also be maintained by either the first and/or second server types, for querying by the client.

27 Claims, 5 Drawing Sheets

CLIENT-SERVER CONFERENCE AND USER SEEKING THROUGH A SERVER STORING A LIST COMPRISING ACTIVE CONFERENCE SERVERS AND EXCLUDING NONACTIVE CONFERENCE SERVERS

FIELD

This invention relates generally to client-server communication, and more particularly to the seeking of conferences and users via such communication.

BACKGROUND

With the advent of computer networking, such as local-area networks (LAN), wide-area networks (WAN), intranets and the Internet, several applications have become popularized. In a first such application, a user of a first client computer is able to "call" and communicate with a user of a second client computer. In a second such application, the users of a number of such client computers are able to communicate with one another within a conference, similar to a telephone conference call.

However, in a large organization, or over an intranet or the Internet, there may be many users and many conferences, such that it may be difficult for any one user to learn of the conferences that may be joined or the other users that may be communicated with. To alleviate this problem, dynamic directories within products such as MICROSOFT NET MEETING have been created that store directories of available users to communicate with. Typically, such dynamic directories are stored on a type of server known within the art as an Information Locator Server (ILS). However, these types of servers as encased within products such as MICROSOFT NET MEETING may not also provide for the capability of storing conferences as well as users.

Furthermore, these types of servers introduce another problem for a user who desires to learn of other users that may be communicated with. Frequently, there may be many of these servers on a given network. The user, therefore, is required to know a priori the address of each of these servers before contacting them to learn of the users stored in their directories. This information may not, however, be known to the user, who may only know of one or two, but not all, of the relevant servers to contact. For these and other reasons, there is a need for the present invention.

SUMMARY

The above-identified problems, shortcomings and disadvantages with the prior art, as well as other problems, shortcoming and disadvantages, are solved by the present invention, which will be understood by reading and studying the specification and the drawings. In one embodiment, a system includes at least one server of a first type, such as an Information Locator Server (ILS), a server of a second type, such as an NT Directory Server (NTDS), and a client. Each of the at least one server of the first type maintains at least one conference. The server of the second type stores a server list of the servers of the first type. Thus, the client queries this latter server to obtain the server list, and then is able to query each server on the list to learn of the conferences maintained by these servers. User lists may also be maintained by either the first and/or second server types, for querying by the client.

Thus, embodiments of the invention provide for advantages not found in the prior art. The client only has to know the address of the server of the second type to learn of available conferences and/or users on the system—this server gives the client information regarding the servers of the first type which the client can then query. Furthermore, the system according to at least some embodiments of the invention provide for the storing of both conference and user information, and not only one or the other.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method, in accordance with an embodiment of the invention, is provided. Finally, in the fourth section, a conclusion of the detailed description is provided.

Hardware and Operating Environment

Figure 1:
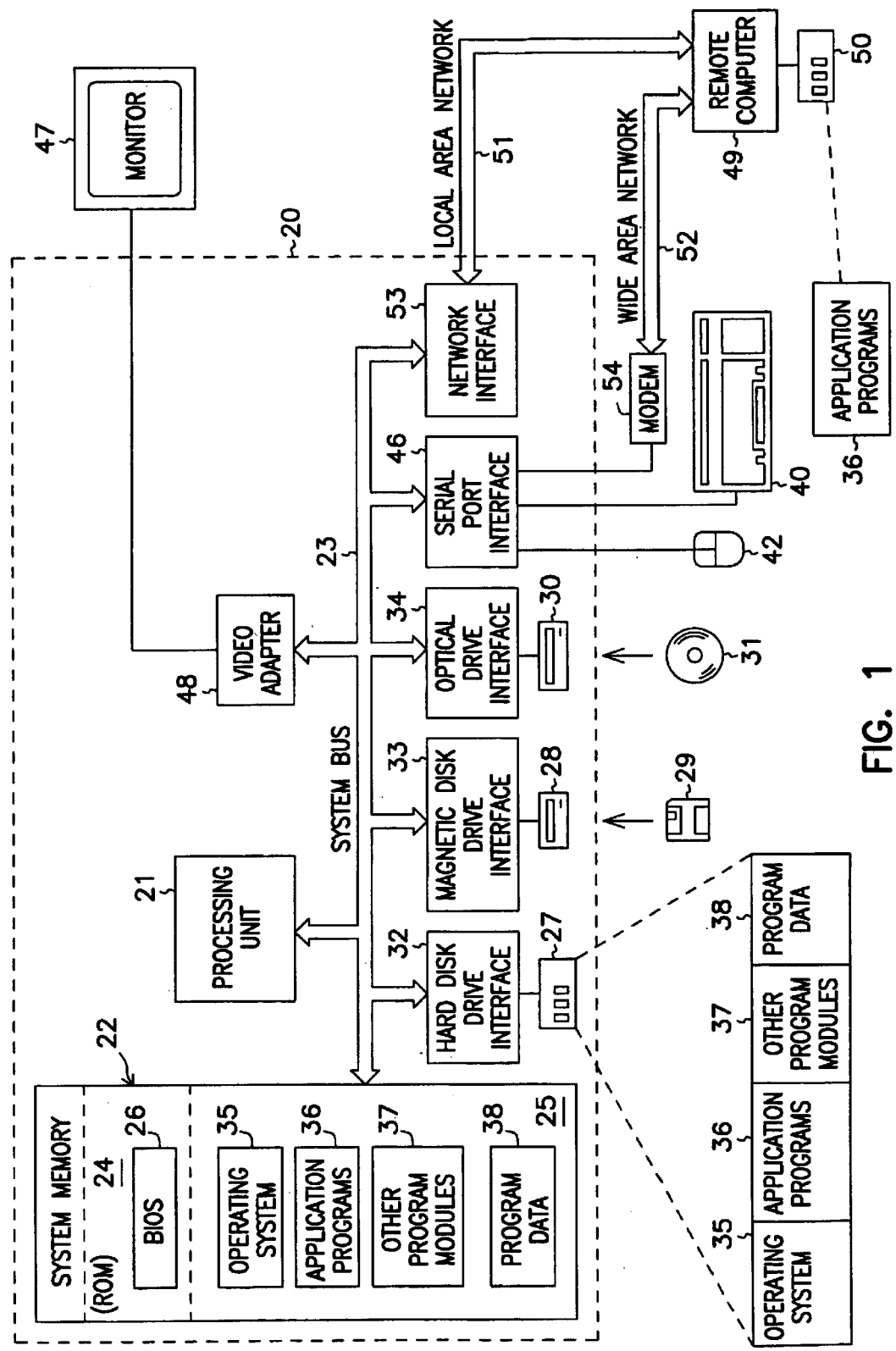
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer.

Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
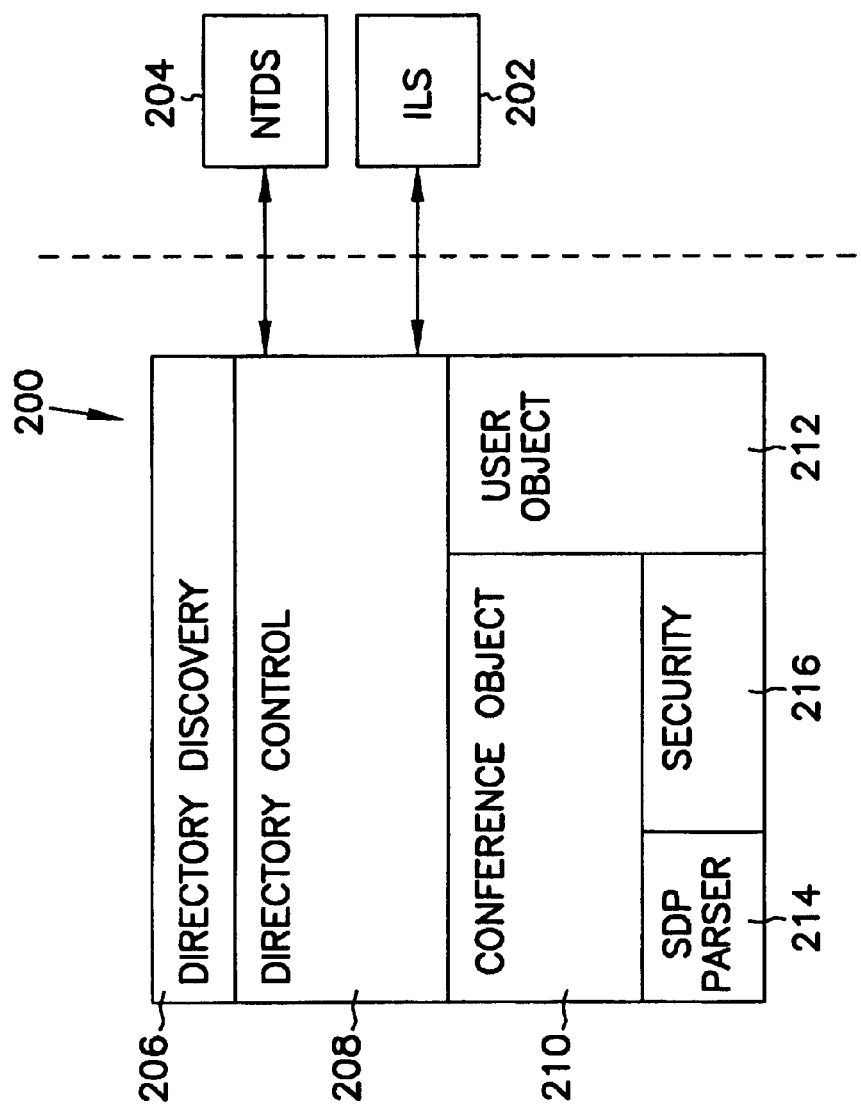
FIG. 2 shows a block diagram of a system according to one embodiment of the invention.

In this section of the detailed description, a description of a computerized system according to an embodiment of the invention is provided. The description is provided by reference to FIG. 2. Referring now to FIG. 2, a system according to an embodiment of the invention is shown. The system includes a client 200, a first server 202, and a second server 204. The client 200 is a client computer, which in one embodiment can be a computer as described in the preceding section of the detailed description. Furthermore, each of the first server 202 and the second server 204 is a server computer, which in one embodiment can also be a computer as describing in the preceding section of the detailed description. As shown in FIG. 2, there is only one server 202; however, this is for clarity purposes only—in other embodiments of the invention, there is a plurality of servers 202.

The server 202 is a server of a first type, in one particular embodiment, an Internet Locator Server (ILS) as known within the art. The server 202 maintains at least one conference previously established by a client computer, such as the client 200. The server 202 in one embodiment also maintains a list of users. The invention is not particularly limited to a given type of list. In one embodiment, the list can be a directory service, such as that governed by the Lightweight Directory Access Protocol (LDAP) known within the art. That is, as used herein, the term "list" is inclusive of directory services as known within the art. The conferences maintained via the server 202 can also be listed in a directory governed by the LDAP.

The server 204 is a server of a second type, in one particular embodiment, an NT Directory Server (NTDS) as known within the art. The server 204 stores a server list of the servers such as the server 202 (viz., for example, more than one server 202). The server 204 in one embodiment also maintains a list of users. The invention is not particularly limited to a given type of list in either case. In one embodiment, the list can be a directory service, such as that governed by the LDAP. That is, as used herein, the term "list" is inclusive of directory services as known within the art.

The invention provides for support of the two types of servers because servers of different types may be responsible for handling data of different types. For example, servers such as NTDS's, are designed to handle static data, such as the configuration of the network, user accounts, etc. Other servers, such as ILS's, are designed to handle highly dynamic data, such as logged-on users, on-going conferences, etc. The design goals and implementation techniques for these two types of servers may be conflicting: NTDS's cannot handle dynamic data in general and ILS's cannot accomplish replication across an enterprise in general. Thus, because of the limitations of these two types of servers, the invention provides for a hybrid solution: using multiple ILS's to handle dynamic data and use an NTDS to organize them.

The client 200 thus is able to query the server 204 to obtain the server list, and then query the server 202 (and each server such as the server 202) on the server list to learn of the conference or conferences maintained by the server 202. That is, the client 200 is able to obtain a list of all the servers such as the server 202, and then can query each of these servers. The client 200, for example, may query the servers looking for a specific conference, a conference having a specific user, etc.; the invention is not so limited.

Furthermore, in one embodiment of the invention, the client 200 is also able to query each server on the server list (after having queried the server 204 to obtain the server list) to learn of the lists of users maintained by these servers. Thus, the client 200 may query the servers looking for a specific user, users at a specific location, etc.; the invention is not so particularly limited. In another embodiment of the invention, the client 200 is also able to query the server 204 to learn of a list of users maintained by the server 204. In this embodiment, too, the client 200 may query the server 204 looking for a specific user, users at a specification location, etc.; the invention is not so particularly limited.

In one particular embodiment of the invention, the client 200 includes a directory discovery module 206, a directory control module 208, one or more conference object 210, one or more user objects 212, a parser module 214, and a security module 216. Each of the modules is in one embodiment implemented as a piece of software. Each of the objects in one embodiment is implemented as a software data object. In one embodiment, each of the modules and objects corresponds to a means for performing a particular functionality. The invention is not so limited, however.

The directory discovery module 206 allows the client 200 to find and register the server 204 and the servers such as the server 202. This is accomplished in one embodiment via the dynamic data library (DDL) WINSOCK, as known within the art. Registration and finding (discovery) of servers is also known within the art.

The directory control module 208 allows the client 200 to connect and authenticate with the server 204 and the servers such as the server 202. That is, the module 208 controls the access to directories. The module 208 knows the schemas on different kinds of directory services such that it is able to store and access conference and user information obtained from the servers. The module 208 thus in one embodiment is able to provide a common Component Object Model (COM) interface, as known within the art, to different kinds of directories for conference information and user information. Connection and authentication of servers is known within the art. Each of the conference objects 210 and the user objects 212 stores information regarding a conference and a user, respectively. Each conference object 210 is an abstraction of a multimedia conference description, defining a COM interface to description information such as the conference content, time, media information, etc. In one embodiment, the Session Description Protocol (SDP), known within the art, is used to publish and join conferences. Windows NT-based security, also known within the art, can also be used in one embodiment to provide for security of conference objects. The information within each conference object 210 can in one embodiment include a Time To Live (TTL) attribute that determines the lifetime of the conference referenced in a particular object 210.

Each user object 212 is an abstraction of a user's contact information so that "calls" may be made to the user. It defines a COM interface for the application to provide for updating and querying properties of a user, such as telephone number, Internet Protocol (IP) address, computer name, etc. In one embodiment, an object 212 includes a Time To Live (TTL) attribute to determine the lifetime of the user; thus, mobile users are able to set small values for these attributes such that invalid entries in the directory are deleted on expiration. Such users can then periodically update their current location information.

The parser module 214 parses conference information received from the servers such as the server 202. That is, it is used in conjunction with the conference objects 210 to provide a manner by which the client 200 is able to communicate with the servers such as the server 202 to retrieve conference information. In one embodiment, the parser module 214 implements the Session Description Protocol (SDP) known within the art.

Finally, the security module 216 encrypts each conference object and each user object. (It is noted that conference objects cannot be authenticated; only clients are authenticated.) That is, it is used in conjunction with the objects 210 and 212 and the other modules to provide a manner by which the client 200 is able to provide a level of security as to the data stored in these objects and as used by the other modules, and ensure the user and conference information retrieved from the servers such as the server 202 is authentic. In one embodiment, the security schema is based on that of Windows NT, as known within the art. For example, a secure channel is established, such that all ensuing communication, including asking, obtaining, and modifying user and conference information, is encrypted. The security module 216 can in another embodiment provide for permissioning, via ACL's as known in the art, such that selected users and groups may be denied or provided access as desired.

Exemplary Operations

In this section of the detailed description, exemplary operations according to embodiments of the invention are presented. This description is provided in reference to FIGS. 3(a) through 3(c). These exemplary operations are desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer.

Thus, in one embodiment, a computer program is executed by a processor of a computer from a medium therefrom to query a first server to obtain a server list and to query each server on the server list to learn of at least one conference maintained by each server on the server list. In another embodiment, the program further is to query each server on the server list to learn of a list of users maintained by each server on the server list. In still another embodiment, the program further is to query the first server to learn of a list of users maintained by the first server.

Figure 3A:
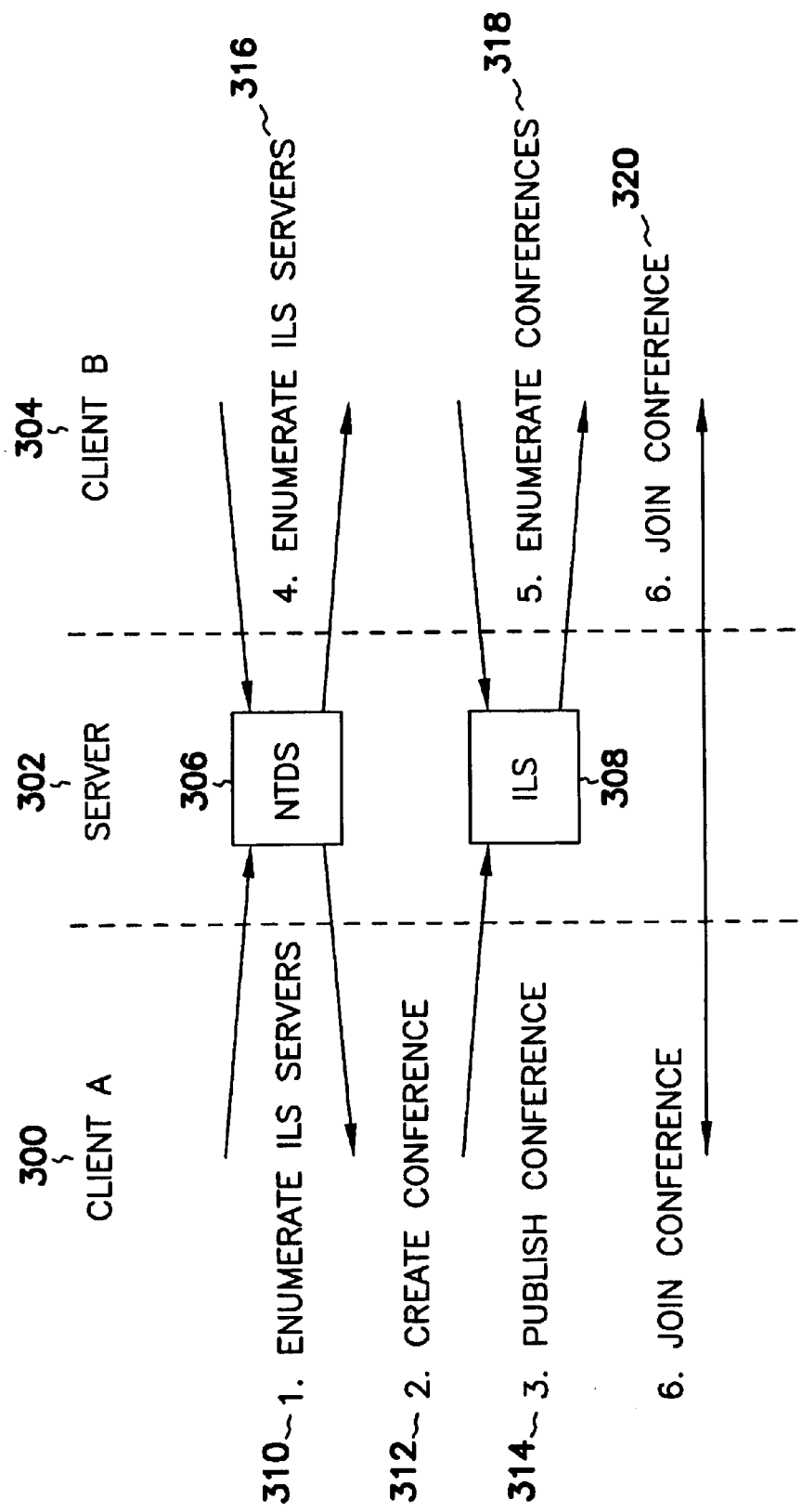
FIG. 3(a) shows a diagram of a client obtaining information regarding joinable conferences, according to one embodiment of the invention.

Referring now to FIG. 3(a), a diagram of a client obtaining information regarding joinable conferences, according to one embodiment of the invention, is shown. There are two communications by two clients in this diagram, a first client 300 and a second client 304. Furthermore, there is communication by two servers, as represented by 302, an NTDS (first type) server 306, and an ILS (second type) server 308. In the embodiment of FIG. 3(a), the NTDS server 306 maintains a list of ILS servers such as the server 308, and each ILS server is capable of maintaining one or more conferences, in one embodiment via a directory of such conferences.

In 310, the first client 300 queries the NTDS server 306 to learn of the available ILS servers, such as the ILS server 308. The first client 300 then in 312 creates a conference, in one embodiment by creating a conference object as has been described in the previous section of the detailed description, and publishes the conference object in 314 to the desired ILS server, the ILS server 308. This conference is then maintained by the ILS server 308, such that other clients can learn of and join the conference by querying the ILS server 308.

In 316, the second client 316 queries the NTDS server 306 to learn of the available ILS servers, such as the ILS server 308. The second client 316 then in 318 queries the ILS server 308 to learn of the conferences maintained by the ILS server 308, such as the conference previously published the first client 300 to the ILS server 308 in 314. Finally, in 320, the clients 300 and 304 join the conference maintained by the ILS server 308.

Figure 3B:
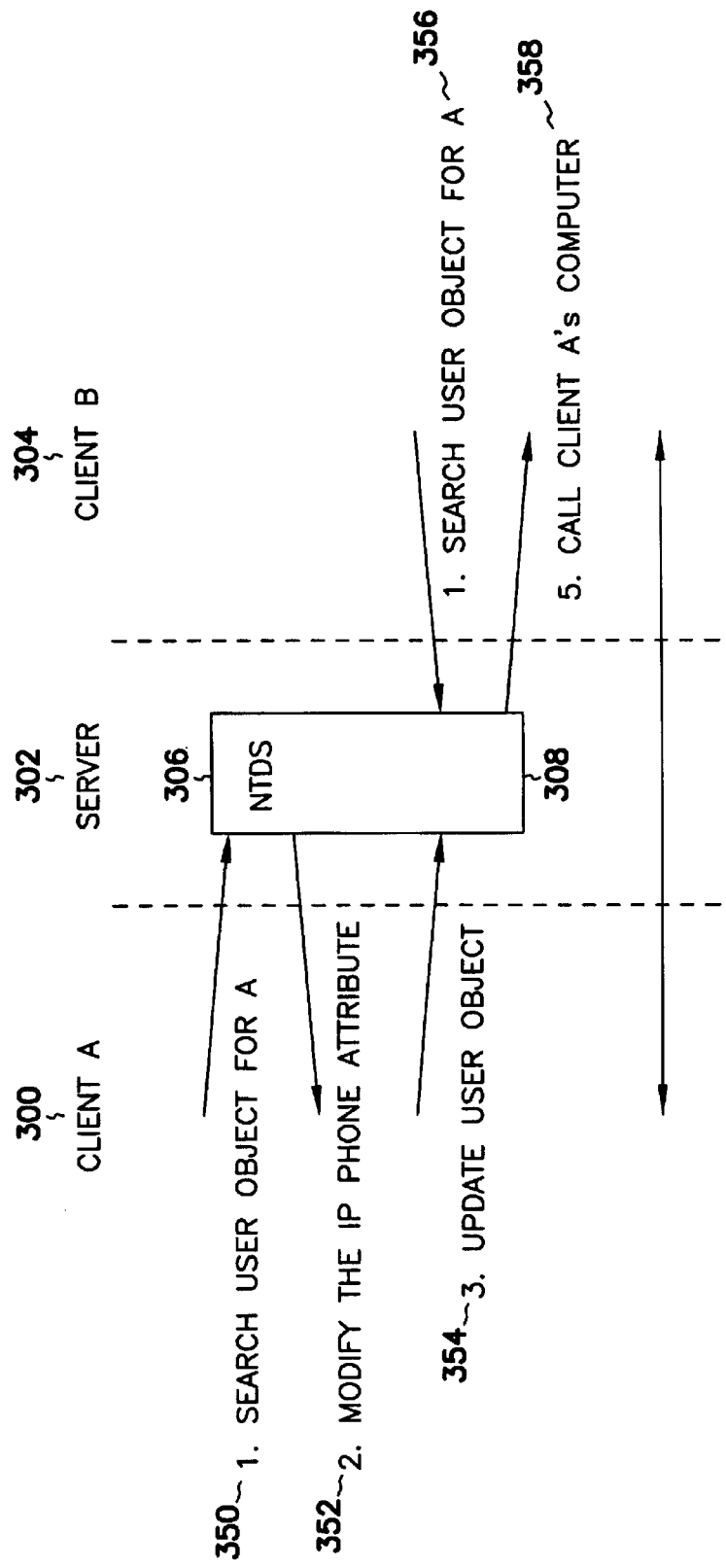
FIG. 3(b) shows a diagram of a client querying a server for a user, according to one embodiment of the invention; and, FIG. 3(c) shows a diagram of a client querying a server for a user, according to another embodiment of the invention.

Referring next to FIG. 3(b), a diagram of a client querying a server for a user, according to one embodiment of the invention, is shown. As in FIG. 3(a), there are two communications by two clients in this diagram, a first client 300 and a second client 304. Furthermore, there is communication by a server, as represented by 302, specifically an NTDS (first type) server 306. In the embodiment of the invention of FIG. 3(b), user information (e.g., a directory of users) is stored on the NTDS server 306.

In 350, the first client 300 queries the NTDS server 306 for itself; that is, in one embodiment, the first client 300 queries the NTDS server 306 for a user object, as has been described in the previous section of the detailed description, as stored by the NTDS server 306. In 352, the first client 300 modifies information regarding itself as stored in the user object for itself. This information may include, for example, the current Internet Protocol (IP) address of the first client 300, so that other clients can "call" (that is, communicate with), the first client 300. In 354, the first client 300 updates the modified user object with the NTDS server 306.

In 356, the second client 304 queries the NTDS server 306 for the first client 300. That is, in one embodiment, the second client 304 queries the NTDS server 306 to find a user object having information regarding the first client 300. For example, the second client 304 may know the computer or user name of the first client 300, and desires to learn the IP address of the first client 300, so that it may call the first client 300. (In one embodiment, only mapping from a user name to an Internet Protocol (IP) address is supported, and not computer name to IP address.) Once it receives this information, in 358 the second client 304 calls (communicates with) the first client 300.

Figure 3C:
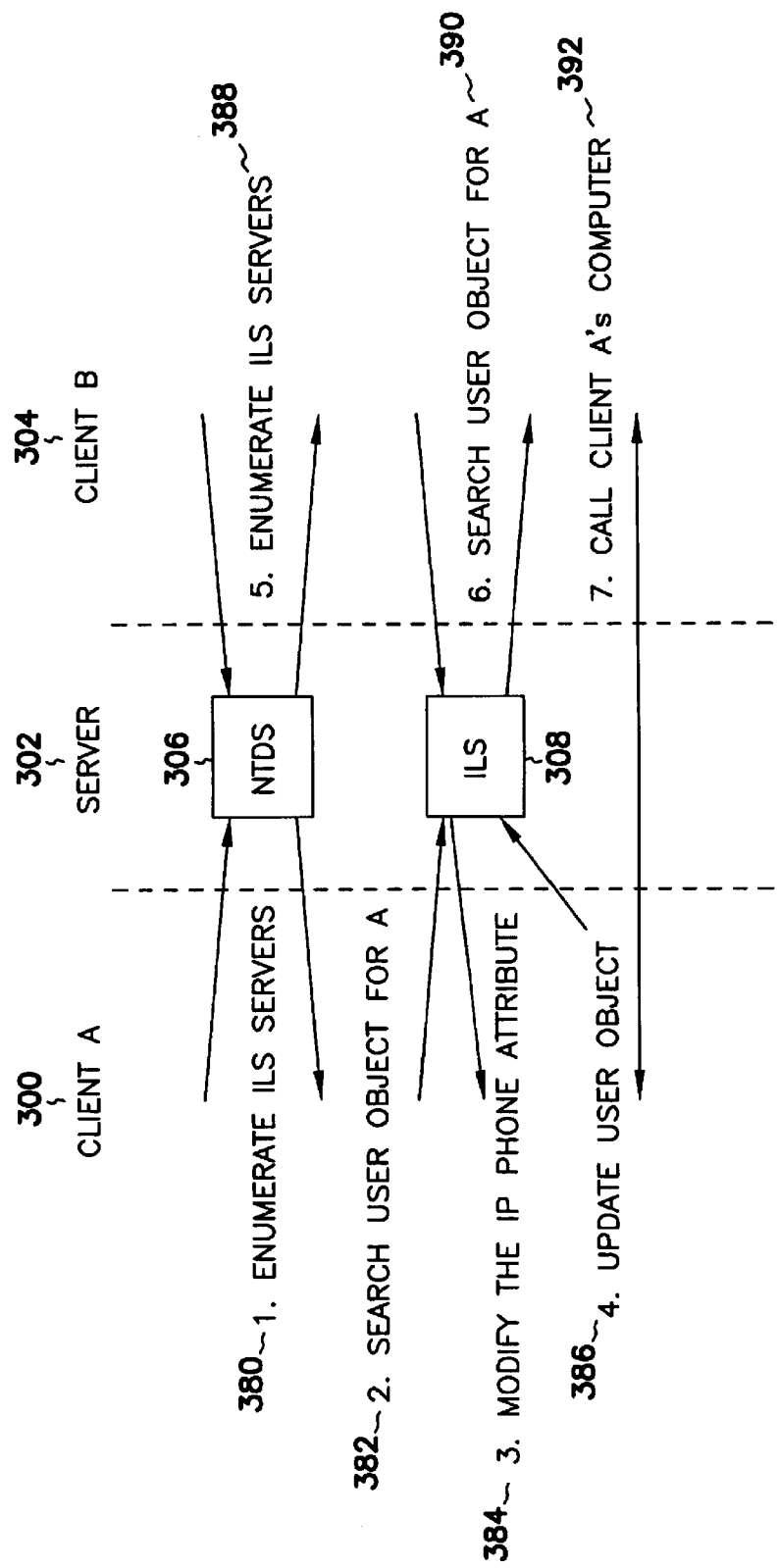

Referring finally to FIG. 3(c), a diagram of a client querying a server for a user, according to another embodiment of the invention, is shown. As in FIG. 3(a) and FIG. 3(b), there are two communications by two clients in this diagram, a first client 300 and a second client 304. Furthermore, there is communication by two servers, as represented by 302, an NTDS (first type) server 306, and an ILS (second type) server 308. In the embodiment of FIG. 3(c), the NTDS server 306 maintains a list of ILS servers such as the server 308, and each ILS server is capable of maintaining one or more users, in one embodiment via a directory of such users.

In 380, the first client 300 queries the NTDS server 306 to learn of the available ILS servers, such as the ILS server 308. The first client 300 then in 382 queries the ILS server 308 for itself; that is, in one embodiment, the first client 300 queries the ILS server 308 for a user object, as has been described in the previous section of the detailed description, as stored by the ILS server 308. In 384, the first client 300 modifies information regarding itself as stored in the user object for itself. This information may include, for example, the current Internet Protocol (IP) address of the first client 300, so that other clients can "call" (that is, communicate with), the first client 300. In 386, the first client 300 updates the modified user object with the ILS server 308.

In 388, the second client 316 queries the NTDS server 306 to learn of the available ILS servers, such as the ILS server 308. The second client 304 then in 390 queries the ILS server 308 for the first client 300. That is, in one embodiment, the second client 304 queries the ILS server 308 to find a user object having information regarding the first client 300. For example, the second client 304 may know the computer or user name of the first client 300, and desires to learn the IP address of the first client 300, so that it may call the first client 300. Once it receives this information, in 392 the second client 304 calls (communicates with) the first client 300.

Conclusion

Client-server user and conference seeking has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A system comprising:

at least one server of a first type, each of the at least one servers of the first type disposed to manage data of a first type including maintaining at least one conference and a list of users;

a server of a second type disposed to manage data of a second type including storing a list of the at least one servers of the first type and excluding servers that do not maintain at least one conference from the list; and a client to query the server of the second type to obtain the server list and to query each server on the server list to learn of the at least one conference maintained by each server.

2. The system of claim 1, wherein the client queries each server on the server list to learn of the list of users maintained by each server.

3. The system of claim 1, wherein the server of the second type further is to maintain a list of users, and the client further is to query the server of the second type to learn of the list of users maintained by the server.

4. The system of claim 1, wherein the first type comprises an Internet Locator Service (ILS) type of server.

5. The system of claim 1, wherein the second type comprises a NT Directory Server (NTDS) type of server.

6. The system of claim 1, wherein the client comprises:

a first module to find and register the at least one server of the first type and the server of the second type; and, a second module to connect and authenticate with the at least one server of the first type and the server of the second type.

7. The system of claim 1, wherein the client comprises:

a conference object for each conference learned of by the client, each object storing information regarding a conference; and, a user object for each user learned of by the client, each object storing information regarding a user.

8. The system of claim 1, wherein the client comprises:

a security module to encrypt and authenticate each conference object and each user object; and, a parser module to parse conference information received from the at least one server of the first type.

9. The system of claim 8, wherein the conference information is in accordance with the Session Description Protocol (SDP).

10. A method for determining information concerning conferences handled by a server of a first type based on configuration data maintained by a server of a second type comprising the steps of:

creating and publishing a conference by a first client to the server of the first type;

querying by a second client the server of the second type, storing a list of the at least one servers of the first type that excludes servers that do not maintain at least one conference, to learn of the server of the first type; and, querying by the second client of the server of the first type to learn of the conference published by the first client.

11. The method of claim 10, further comprising joining by the second client of the conference by the first client.

12. The method of claim 10, further comprising the step of querying by the second client of the server of the second type for an identification of the first client.

13. The method of claim 12, further comprising: querying by the second client of the server of the second type for an identification of the first client;

modifying by the first client of information stored in a user object regarding the first client; and, updating by the first client of the user object with the server of the second type.

14. The method of claim 12, further comprising calling by the second client of the first client.

15. The method of claim 10, further comprising querying by the second client of the server of the first type for the first client.

16. The method of claim 15, further comprising:

querying by the first client of the server of the first type for the first client;

modifying by the first client of information stored in a user object regarding the first client; and, updating by the first client of the user object with the server of the first type.

17. The method of claim 15, further comprising calling by the second client of the first client.

18. The method of claim 10, wherein the first type comprises an Internet Locator Service (ILS) type of server, and the second type comprises an NT Directory Server (NTDS) type of server.

19. A client computer comprising:

a processor;

a computer-readable medium, and a computer program executed by the processor from the medium to query a first server, disposed to manage data of a first type including a server list that includes at least one server of the first type and excludes servers that do no maintain at least one conference, to obtain the server list maintained by the first server and a list of users maintained by the first server and to query each server on the server list to learn of at least one conference maintained by each server on the server list.

20. The client computer of claim 19, wherein the computer program further is to query each server on the server list to learn of a list of users maintained by each server on the server list.

21. The client computer of claim 19, wherein the computer program comprises:

means for finding and registering the first server and each server on the server list;

means for connecting and authenticating with the first server and each server on the server list;

means for storing information regarding each conference learned of by the client; and, means for storing information regarding each user learned of by the client.

22. The client computer of claim 21, wherein the computer program further comprises:

means for encrypting and authenticating themeans for storing information regarding each conference learned of by the client and means for storing information regarding each user learned of by the client; and, means for parsing conference information received by each server on the server list.

23. A computer-readable medium having a computer programed stored thereon for execution on a computer to query a first server, disposed to manage data of a first type including a server list of at least one server of the first type that excludes servers that do not maintain at least one conference and also including a list of users maintaine by each server on the server list, to obtain the server list and to query each server on the server list to learn of at least one conference maintained by each server on the server list.

24. The medium of claim 23, wherein the program furthe is to query the first server to learn of a list of users maintained by the first server.

25. The medium of claim 23, wherein the program comprises:

mens for finding and registering the first server and each server on the server list;

means for connecting and authenticting with the first server and each server on the server list;

means for storing information regarding each conference learned of by the client;

means for storing information regarding each user learned of by the client;

means for encrypting and authenticating the means for storing information regarding each conference learned of by the client and means for storing information regarding each user learned of by the client; and, and means for parsing conference information received by each server on the server list.

26. The invention as in claim 1, wherein the data of the first type is dynamic data and the data of the second type is static data.

27. The invention as in claim 10, wherein the server of the first type is disposed to handle dynamic data and the server of the second type is disposed to handle static data.

* * * * *